Dec. 13, 1955  A. KREIDLER  2,726,747
VARIABLE RATIO POWER TRANSMISSION GEAR
Filed Feb. 3, 1954  2 Sheets-Sheet 1
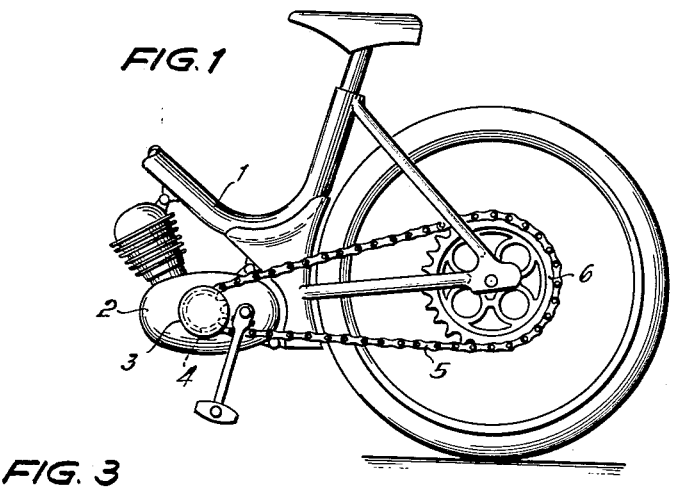
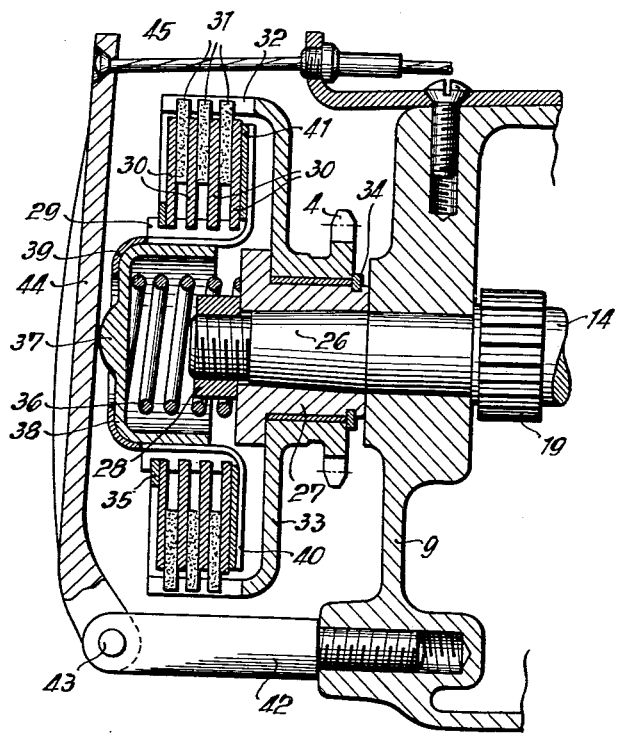
INVENTOR
ALFRED KREIDLER
By Ernest G. Montague
ATTORNEY

United States Patent Office 2,726,747
Patented Dec. 13, 1955

2,726,747

VARIABLE RATIO POWER TRANSMISSION GEAR

Alfred Kreidler, Stuttgart-O, Germany

Application February 3, 1954, Serial No. 407,951

5 Claims. (Cl. 192—3.5)

The present invention relates to variable speed gear transmission mechanism especially for self-propelled vehicles provided with pedalling gear, such as engine-assisted bicycles or light motorcycles, wherein speed changes may be made without clutch disengagement with subsequent engagement into the new gear.

It is an object of the invention to provide a transmission mechanism of this type which, when applied to a vehicle as aforesaid, allows the engine to continue running during stops and the vehicle to be moved in either direction with the engine running or switched off.

A further object of the invention is to provide a comparatively low running speed having regard to the high speeds of up to 7,000 revolutions per minute which are usual in modern light vehicle engines.

A further object of the invention aims to reduce the effort required to start an engine-assisted bicycle, where the customary procedure has been to propel the vehicle in gear by pedalling. With the present form of transmission it is now possible to start the engine with the vehicle stationary by treading down either of the pedal crank arms. Alternatively, the pedal crank drive may also be constructed as a single crank kick starter which is the case with a motorcycle having a normal foot rest arrangement.

The invention will be described further, by way of example with reference to the accompanying drawings, in which—

Fig. 1 is a diagrammatic side elevation of the arrangement of the driving mechanism for an engine-assisted pedal cycle.

Fig. 3 is a vertical section through a form of construction of the friction clutch.

Figure 2:
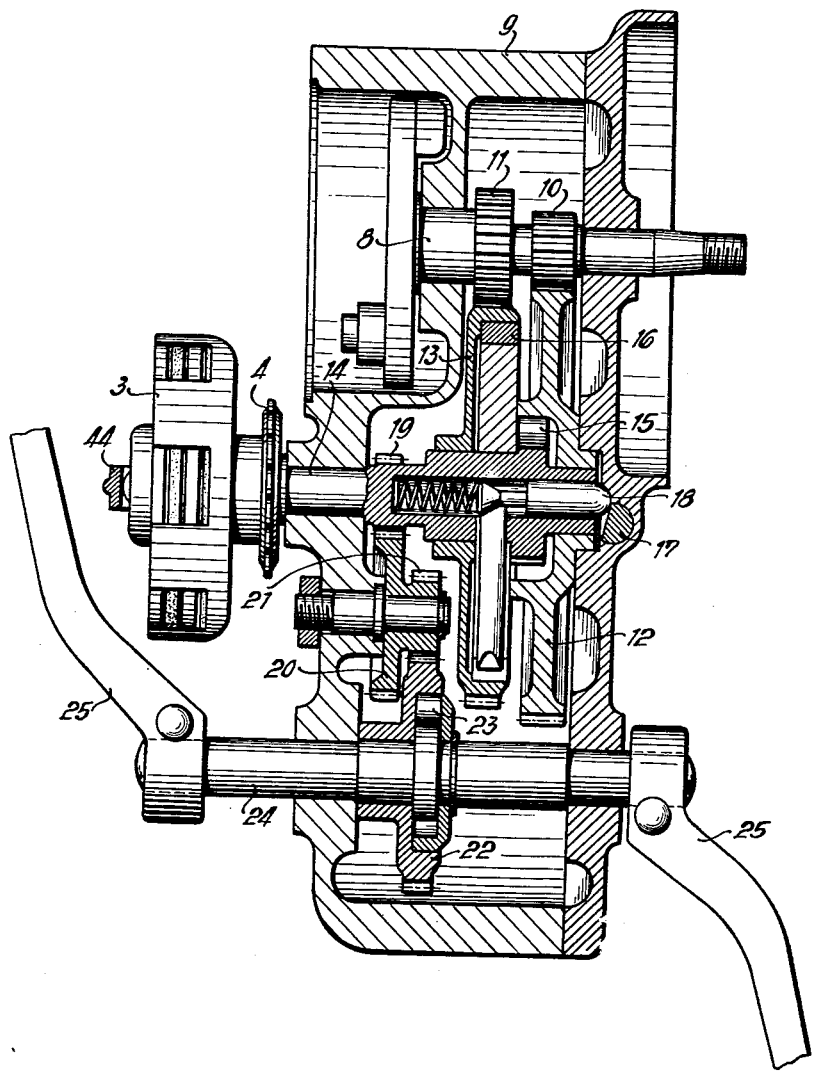
Fig. 2 is a horizontal section through the drive showing the parts essential for understanding the invention.

As shown in Fig. 1 an enclosed engine transmission gearing unit 2 is suspended on the frame 1 of the vehicle. This contains the engine, the reduction gear and a pedal crank drive. On the driven shaft of the gear mechanism is disposed a disengageable friction clutch 3 which couples a driven sprocket wheel 4, with the driving mechanism shaft. The driven sprocket wheel 4, a chain 5 and a rear chain wheel 6 transmit power to a rear wheel 7 of the vehicle.

The construction of the driving mechanism may be seen in detail from the section shown in Fig. 2. A crank shaft 8 is rotatably mounted in a gear casing 9. Two pinions 10, 11 machined thereon mesh with gear wheels 12 and 13 rotatably mounted on a driven shaft 14. The gear wheel 12 corresponding to the low speed transmission is connected with the driven shaft 14 through a free wheel clutch 15 which transmits the drive from the gear wheel 12 to the shaft 14 only in the forward direction of rotation. The gear wheel 13 corresponding to the high speed transmission is coupled with the driven shaft by an expanding ring clutch element 16 urged into engagement by the action of a spring. The driven shaft may be disengaged by means of the flattened control shaft 17 which, on rotation, moves the spring-loaded stud 18 to the left. This arrangement of the gear mechanism renders smooth engagement possible, the low speed gear mechanism 10, 12 being engaged by means of the free-wheel clutch 15 when the clutch 16 is disengaged.

A pinion 19, with which the gear wheel 20 of a reduction gear 20, 21 meshes is rigidly connected with the driven shaft 14. The second gear wheel 21 thereof meshes with a gear wheel 22 with which the pedal crank shaft 24 is coupled for movement in the forward direction by means of a free-wheel clutch 23. The arms 25 of the pedal crank are keyed at each end thereof, the ends projecting beyond the gear casing 9. Finally, the sprocket wheel 4 running loosely by itself on the driven shaft 14 may be connected with the shaft by the disengageable friction clutch 3.

The construction of the friction clutch itself may be described as follows with reference to Fig. 3, for example:

A stepped driving bush 27 is pressed on to a cone 26 of the driven shaft 14 by a nut 28 so that it cannot be twisted. The enlarged part of the driving bush 27 is provided with axially extending slots 29 in which tongues of metal discs 30, constructed in known manner, engage. Between the metal discs 30 cork discs 31 are disposed and have outwardly directed driving projections engaging in slots 32 of the clutch casing 33 connected to the driven sprocket wheel 4. The sprocket wheel 4 with the casing 33 of the clutch runs loose on the hub-like section of the driving bush 27. It is secured thereon against longitudinal displacement by means of an expanding ring 34. The discs 30, 31 are held against outward movement longitudinally of the bush (that is to say, to the left of the drawing) by a second expanding ring 35 carried by the driving bush 27. The assembly of discs is loaded by the centrally mounted helical spring 36 which operates on a spider 39 through a cap 38 provided with a central projection 37. The legs 40 of this spider 39 extend firstly parallel to the axis and are then bent radially outwards and engage in slots 29 behind the disc assembly 30, 31 to which it transmits the spring force through a pressure ring 41. The pressure ring is conveniently connected to the turned up ends of the legs 40 by soldering or welding. A stud 42 is screwed in the casing 9, and on a lug 43 thereof is hinged a disengaging lever 44 for the clutch. A Bowden cable 45 is mounted in a suitable manner for the actuation of this lever. In the resting position, that is to say, when the clutch is engaged, the lever 44 is disposed approximately with the middle portion abutting against the projection 37 of the cap 38 with comparatively little pressure.

For disengaging the clutch the lever 44 is drawn to the right by the Bowden cable and compresses the spring 36 through the cap 38, whereby the discs 30, 31 are unloaded and the friction lock between them is released.

Apart from the advantages which the speed transmission described above offers in itself and which are preserved by the provision of the clutch between the gear mechanism 14, 18 and the chain drive 6, 8, this arrangement renders it possible to stop the vehicles with the engine running or to move it both backwards and forwards with the engine switched off or running. In addition a comparatively low speed is possible with the clutch 3 slipping. A reliable operation of the clutch is ensured and a simple compact construction rendered possible.

Furthermore, the arrangement of the pedal crank drive 19—25 permits starting the engine when the vehicle is stationary. For this purpose, the clutch 3 must be disengaged so that the connection between the drive mechanism 10—14 and the chain drive 4—6 is interrupted. In addition, the high speed gear mechanism 13, 11 is engaged. Now either of the pedal crank arms 25 is set to a suitable position and is depressed sharply. This starts the engine crank shaft 8 rotating by means of the high speed gear mechanism 11, 13 through the drive connection 14, 19—24, and the engine starts. The driver now has the choice of engaging the clutch 3 to start immediately (naturally accelerating accordingly) or—which is to be preferred—previously engaging the low speed gear mechanism 10, 12 by disengaging the expanding ring clutch 16 for starting.

Of course, it is also possible to start the vehicle by putting it in gear with the clutch 3 engaged and the gear clutch 16 disengaged and subsequently by engaging the clutch 16, that is to say, of the high speed gear mechanism 13, 11. The vehicle can also be moved when the engine is switched off by pedalling and, finally, the engine can be assisted in either speed by pedalling when the clutch 3 is engaged.

Similarly, the pedal crank shaft 24 having arms 25 on both sides can be replaced by a simple kick starter device and, in addition, the vehicle suitably fitted in the manner of a normal motorcycle with fixed foot rests or the like. In order to start the engine the clutch 3 can also be disengaged and the clutch 16 engaged.

This application is a continuation-in-part of my co-pending application No. 259,339 filed December 1, 1951.

I claim:

1. In an engine unit suitable for light self-propelled vehicles, such as an engine-assisted bicycle, and including a crank shaft, a variable speed transmission gear mechanism comprising at least two pinions fixed on an extension of said crankshaft, a driven shaft, gear wheels disposed on said driven shaft and meshing respectively with said pinions, a one way drive connection between said driven shaft and one of said gear wheels corresponding to the lowest ratio of transmission, a clutch for at least another of said gear wheels enabling selective engagement into driving connection with said driven shaft, power take-off means and a selectively engageable and disengageable friction clutch interposed between said driven shaft and said power take-off means.

2. In an engine unit suitable for light self-propelled vehicles, such as an engine-assisted bicycle, and including a crankshaft, a variable speed transmission gear mechanism comprising at least two pinions fixed on an extension of said crankshaft, a driven shaft, gear wheels disposed on said driven shaft and meshing respectively with said pinions, a one way drive connection between said driven shaft and one of said gear wheels corresponding to the lowest ratio of transmission, a clutch for at least another of said gear wheels enabling selective engagement into driving connection with said driven shaft, power take-off means, a selectively engageable and disengageable friction clutch interposed between said driven shaft and said power take-off means, a pedal crank shaft and a pedal crank fixed thereon, and a one way drive connection between said pedal crank shaft and said driven shaft.

3. In an engine unit suitable for an engine-assisted bicycle and including a crankshaft, a variable speed transmission gear mechanism enclosed within a casing and comprising at least two pinions fixed on an extension of said crankshaft, a driven shaft, gear wheels disposed on said driven shaft and meshing respectively with said pinions, a one way drive connection between said driven shaft and one of said gear wheels corresponding to the lowest ratio of transmission, a clutch for at least another of said gear wheels enabling selective engagement into driving connection with said driven shaft, power take-off means, a selectively engageable and disengageable friction clutch interposed between said driven shaft and said power take-off means, a pedal crank shaft projecting at each end outside said casing, pedal cranks fixed respectively at each end thereof and a one way drive connection between said pedal crankshaft and said driven shaft.

4. In an engine unit suitable for a light self-propelled vehicle of the motorcycle type and including a crankshaft, a variable speed transmission gear mechanism comprising at least two pinions fixed on an extension of said crankshaft, a driven shaft, gear wheels disposed on said driven shaft and meshing respectively with said pinions, a one way drive connection between said driven shaft and one of said gear wheels corresponding to the lowest ratio of transmission, a clutch for at least another of said gear wheels enabling selective engagement into driving connection with said driven shaft, power take-off means, a selectively engageable and disengageable friction clutch interposed between said driven shaft and said power take-off means, a shaft with a kick starter crank mounted thereon and a one way drive connection between said shaft and said driven shaft.

5. In an engine unit suitable for light self-propelled vehicles, such as an engine-assisted bicycle, and including a crankshaft, a variable speed transmission gear mechanism comprising at least two pinions fixed on an extension of said crankshaft, a driven shaft, gear wheels disposed on said driven shaft and meshing respectively with said pinions, a one way drive connection between said driven shaft and one of said gear wheels corresponding to the lowest ratio of transmission, a clutch for at least another of said gear wheels enabling selective engagement into driving connection with said driven shaft, a sprocket loose on said driven shaft and a selectively engageable and disengageable multi-disc friction clutch to transmit power from said driven shaft to said sprocket, a shaft with a pedal crank fixed thereon and reduction gearing including a one way drive connection to transmit drive from said shaft to said driven shaft.

References Cited in the file of this patent

UNITED STATES PATENTS

| | | |
|---|---|---|
| 1,099,520 | Spacke et al. | June 9, 1914 |
| 2,596,391 | Farinelli | May 13, 1952 |

FOREIGN PATENTS

| | | |
|---|---|---|
| 175,491 | Austria | July 10, 1953 |
| 662,336 | Great Britain | Dec. 5, 1951 |
| 1,044,319 | France | June 17, 1953 |